United States Patent

[11] 3,534,773

[72] Inventors Howard D. Hendrickson, Topsfield;
 Albert W. Dewberry, Boxford,
 Massachusetts
[21] Appl. No. 750,238
[22] Filed Aug. 5, 1968
[45] Patented Oct. 20, 1970
[73] Assignee Watts Regulator Company
 Lawrence, Massachusetts
 a corporation of Massachusetts

[54] TAMPER PROOF VALVE
 10 Claims, 6 Drawing Figs.
[52] U.S. Cl. .................................................. 137/553,
 85/9, 85/45, 137/382
[51] Int. Cl. ................................................F16k 51/00,
 F16b 23/00
[50] Field of Search........................................ 137/377,
 382, 382.5, 384, 553, 556; 85/45; 251/205, 223,
 284, 287, 218, 219, 220; 137/382, 382.5

[56] References Cited
 UNITED STATES PATENTS
| 1,726,302 | 8/1929 | Keema | 251/223X |
| 2,179,045 | 11/1939 | Lewis | 85/45UX |
| 2,362,999 | 11/1944 | Hewitt | 85/45 |
| 2,707,968 | 5/1955 | Efford | 137/382 |
| 3,043,330 | 7/1962 | Young | 137/382X |
| 3,238,968 | 3/1966 | Pecis | 137/556 |
| 3,334,654 | 8/1967 | Donner | 137/553 |
| 982,109 | 1/1911 | Adams | 251/219 |
| 1,353,053 | 9/1920 | Lavigne | 251/220 |
| 2,342,276 | 2/1944 | Hehemann | 137/382 |
| 2,520,092 | 8/1950 | Fredrickson et al. | 137/382X |
| 3,437,106 | 4/1969 | Mueller et al. | 137/382 |

FOREIGN PATENTS
| 969,349 | 9/1964 | Great Britain | 137/382.5 |
| 684,861 | 12/1939 | Germany | 251/218 |

Primary Examiner—Henry T. Klinksiek
Attorney—Lettvin and Gerstman

ABSTRACT: A tamper proof valve, designed to be preset and left with minimal risk of being reset, and having a calibrated reference scale, consists of a valve stem which lies within a surrounding recess, and a removable cap which fits into the recess to engage the stem. The cap and housing forming the recess include a reference scale and index for calibration purposes, and the valve stem terminates in a knob engageable by the cap, the knob being positioned to register zero when the valve is closed. The cap is preferably formed with a leg which engages in snap-on fashion in a groove in the housing surrounding the recess. After a proper setting has been made the cap may be removed to make it difficult for one to reset the valve.

Patented Oct. 20, 1970

3,534,773

INVENTORS
HOWARD D. HENDRICKSON
A. WILLIAM DEWBERRY
BY
Kenway, Jenney & Hildreth
ATTORNEYS

TAMPER PROOF VALVE

SUMMARY OF THE INVENTION

Our invention relates to an adjusting device for use in a valve arrangement or other adjustable control in which it is desirable to discourage and prevent tampering or other unauthorized control of the valve. It is described as being used in connection with an air line lubricator such as disclosed in U.S. Pat. No. 2,887,181 to Dillon which discloses a valve for metering and introducing fine particles of oil into an air stream to carry the oil to various air operated machine parts. Inasmuch as different air-driven machines will require lubrication in varying degrees, the air lubricator is provided with a metering valve for dispensing successively individual drops of oil at the desired rate into the flowing air stream. The rate of oil flow is commonly determined by visually inspecting and counting the drops as they are dispensed from the metering valve. For this purpose a transparent tube is provided through which the individual droplets pass before they enter the air stream.

It is among the objects of our invention to provide an arrangement for quickly and accurately determining the setting of the valve and thus control the flow rate without visually inspecting it and counting the oil droplets. This is achieved by means of an irregularly shaped knob that is secured to the rotatable stem of the valve. The knob is secured to the valve stem while the valve is in its fully closed position and after the valve body has been secured to the lubricator frame. After the knob and valve stem have been assembled their rotation is effected by a cap having a recess for receiving the knob, which recess is of special complementary shape to that of the knob so that the cap and knob are engageable only when the recess and knob are in registry. A reference scale is provided circumferentially about the cap and a fixed reference index is formed on the lubricator frame so that in order to adjust the valve to the desired setting the cap is rotated to bring that character of the reference scale which corresponds to the desired valve setting into registry with the fixed reference index. By securing the knob to the valve stem while the valve is closed and with the knob properly positioned it is insured that the character on the reference scale which is intended to correspond to a closed valve setting will be in registry with the reference index on the lubricator frame and will thus accurately indicate that the valve is, in fact, closed. Similarly registration of other characters on the reference scale with the reference index on the lubricator frame will accurately indicate other valve settings.

The proper positioning of the knob on the valve stem is facilitated by providing a mark or other unique portion on the knob which, when aligned with the reference index on the lubricator frame, indicates that the knob is properly positioned when the valve is closed. Thus by securing the knob on the valve stem in proper position it is insured that the cap will be in proper position when engaged with the knob.

Another object of our invention is to provide a valve and adjusting cap arrangement in which adjustment of the valve may be made only by the cap itself and not by conventional tools or by hand. To this end we provide a knob of irregular peripheral shape which is disposed within in a recess formed in the body of the valve. The periphery of the valve stem is dimensioned with respect to the recess to provide a minimal clearance therebetween to discourage the use of conventional tools in gripping and turning the valve stem. The adjusting cap includes an inner lip which is contoured and dimensioned to fit snugly within the clearance between the valve stem and recess to firmly grip the valve stem. Thus, after the desired adjustments to the valve settings have been made, removal of the cap renders the valve substantially tamper proof.

Another object of our invention resides in the dual function of a portion of the irregular periphery of the knob in that it serves both to provide a reference mark to properly position the knob when securing the knob to the valve stem and to provide a knob that is relatively difficult to grip by conventional tools or by hand.

Other objects and advantages of our invention will be apparent to those skilled in the art from the following detailed description with reference to the accompanying drawings wherein.

Figure 1:
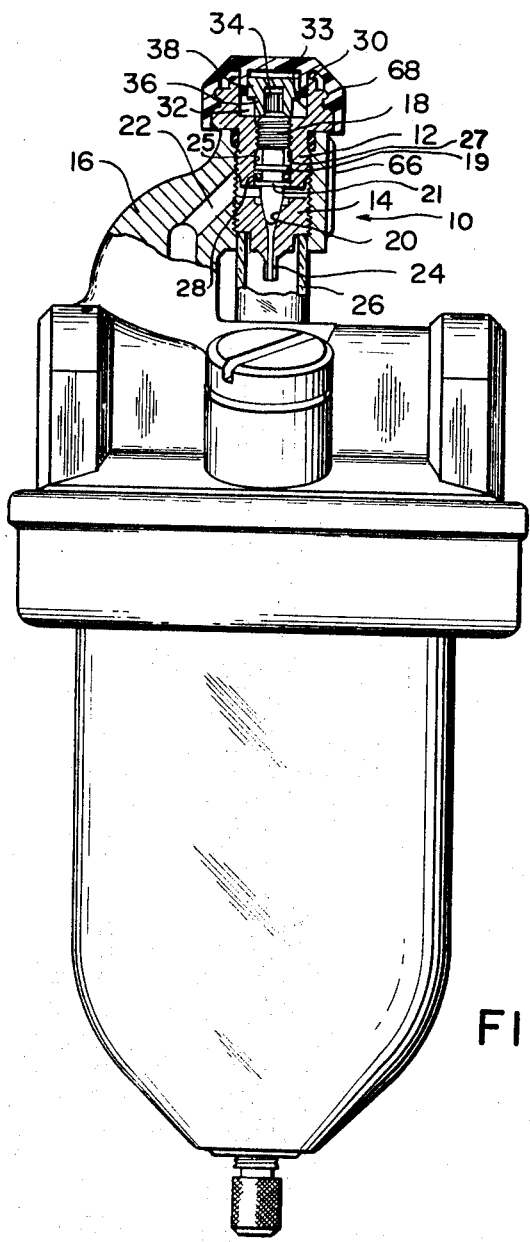
FIG. 1 is a side elevation of an air line lubricator incorporating the invention and illustrating the metering valve in section.

As shown in FIG. 1 the valve 10 includes a needle valve retainer or valve body 12 and a valve seat 14 which may be formed integrally with or mounted to a frame 16 of the lubricator or other device in which the valve is incorporated. A needle valve 18 is threaded into the valve body 12 and is engageable with the valve seat 14 to open or close the metering passage 20 in the valve seat 14. The needle valve 18 has a pair of axially spaced collars 19 and 21 between which is contained a resilient sealing O-ring 23. The O-ring 28 bears against the surface of a valve bore 25 to preclude leakage of any oil compressed from the valve 10. The top of the bore 25 terminates in a narrowed flange 27, which is of smaller dimension than the collar 19 for a purpose later described. A conduit 22 is formed in the frame 16 and serves to communicate oil from a reservoir to the valve seat 14 and metering passage 20. The metering passage 20 terminates in a downwardly extending tube 24 which in turn is contained within a transparent viewing tube 26. As fully described in the aforementioned U.S. patent, oil is caused to flow from the reservoir through the conduit 22 and then through the metering passage 20 at a flow rate determined by the setting of the needle valve 18. The oil droplets drip from the tube 24 through the transparent tube 26 where they may be observed and counted. They are then delivered to the air stream, reference being made to the aforementioned U.S. patent for a full description of the operation of the oil delivery system.

The valve body 12 includes an upwardly extending sidewall 30 which defines a cuplike recess 32 so that a valve stem 34 formed integrally with the needle valve 18 may protrude outwardly into the recess 32 and be surrounded by the sidewall 30. A knob 36 is secured to the stem 34 of the needle valve 18 and is also disposed within the recess. The stem 34 may be splined and is secured to the knob 36 as by a press fit, so that the setting of the valve 18 may be adjusted by rotating the knob 36.

The inner surface 33 of the sidewall 30 which surrounds the knob 36 is dimensioned to provide a relatively small clearance about the periphery 38 of the knob 36 to discourage adjusting of the valve by more conventional tools. The height of the sidewall 30 should be such that it will extend outwardly beyond the knob 36 to an extent such that the knob 36 will always be disposed within the recess 32 throughout its entire range of operating positions. By maintaining the knob 36 within the recess 32 at all times and by providing the minimal clearance between the periphery 38 of the knob 36 and the inner surface 33 of the sidewall 30 the use of conventional tools to tamper with the setting of the valve is discouraged. By way of example, for a knob diameter of approximately .40 inches, a representative clearance between the knob 36 and surface 33 of the sidewall 30 would be in the order of .05 inches. This arrangement insures that the more common tools such as wrenches, screwdrivers, pliers and even needle nose pliers and the like are not readily insertable into such a small clearance to effectively grip the knob 36. The clearance may, of course, be varied within limits which would hinder conventional tools from effectively gripping the periphery 38 of the knob 36.

Figure 2:
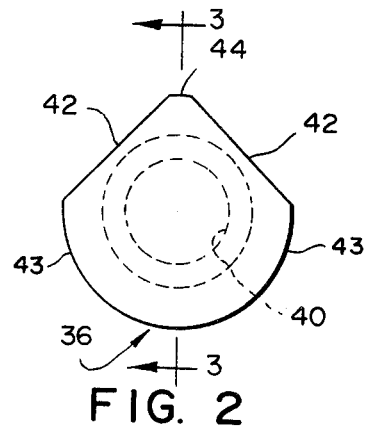
FIG. 2 is a plan view of the knob illustrating its unique peripheral contour.
Figure 3:
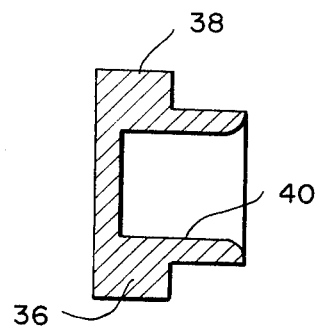
FIG. 3 is a sectional view of the knob as viewed from the line 3–3 of FIG. 2.

The periphery 38 of the knob 36, shown more clearly in FIGS. 2 and 3, is of an irregular, unconventional contour which does not lend itself readily to being gripped by conventional tools. A bore 40 is formed in the underside of the knob and is dimensioned to be press fitted securely onto the valve stem 34 of the valve 18. As shown in FIG. 2, the contour of the periphery 38 of the knob 36 is defined by an arcuate segment 43 and a pair of chordal flats 42. The arcuate portion 43 preferably exceeds an arc of 180° and the flats 42 are disposed at substantially right angles to each other. The flats 42 meet at an apex 44 (co-circular with arcuate portion 43) and diverge from the apex 44 toward and in intersecting relation to the arcuate segment 43. We have found that such a peripheral configuration provides considerable resistance to being firmly gripped by conventional tools. This is particularly true when the knob 36 is contained within the recess 32 and in close proximity to the inner surface of the sidewall 30.

Figure 4:
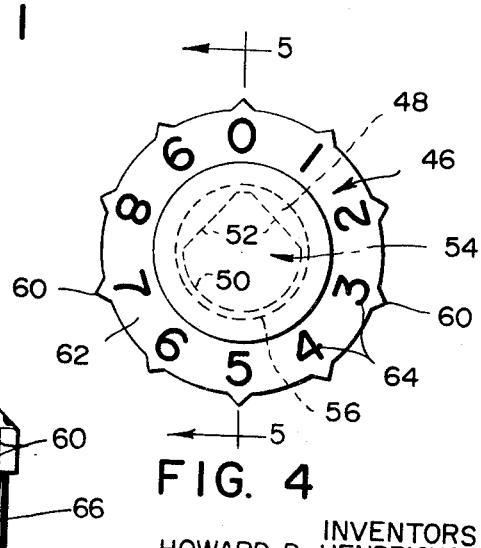
FIG. 4 is a plan view of the adjusting cap.
Figure 5:
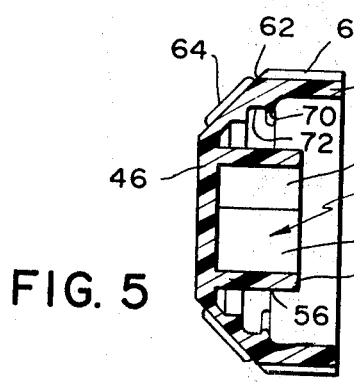
FIG. 5 is a sectional view of the adjusting cap as viewed from the line 5–5 of FIG. 4.

As shown in FIGS. 4 and 5 a specially constructed adjusting cap 46 is provided and is peculiarly shaped to grip the knob 36 and enable adjustment of the valve 18. Accordingly the adjusting cap 46 is provided with an inner lip 48 which is contoured to fit snugly within the clearance between the knob 36 and the sidewall 30 thus to grip firmly the knob 36. The interior surface of the lip 48 includes the arcuate surface 50 and chordal surfaces 52 which complement the corresponding surfaces of the periphery 38 of the knob 36. The recess 54 is defined within the lip 48 and accommodates and grips the knob 36, and is deep enough to permit the needle valve 18 and knob 36 to move freely along the full range of axial movement. The outer surface 56 of the lip 48 is circular to complement the circular configuration of inside wall 33 of the recess 32 formed in the valve body 12.

When adjusting the valve setting the adjusting cap 46 is placed over the end of the sidewall with the recess 54 in registry with the knob 36 so that the lip 48 enters into the clearance between the knob and sidewall. Thus the interior surfaces 50, 52 grip the periphery 38 of the knob 36. The cap 46 may then be rotated to adjust the valve 18 to the desired setting. As mentioned above with regard to air line lubricators such as disclosed in the aforementioned U.S. patent, the flow rate is determined commonly by observing the number of oil droplets falling through the viewing tube 26. In order to adjust the valve more quickly and accurately the adjusting cap 46, in accordance with our invention, is provided with a downwardly extending peripheral skirt 58 having a plurality of circumferentially spaced ridges 60 formed about its outer periphery. The skirt 58 is dimensioned to fit over the upper portion of the valve body 12 and the sidewall 30. The adjusting cap 46 is further provided with a chamfer 62 on which a reference scale having a plurality of reference characters 64 are formed, there being a reference character associated with each of the ridges 60. A fixed reference index 66 (see FIG. 1) is provided on the frame 16 and serves as a reference past which the characters 64 of the scale may move as the cap 46 is rotated to adjust the position of the valve 18. The characters 64 may be formed integrally with the cap 46 and may be raised as indicated in FIG. 5 or may be otherwise applied to the chamfer 62 of the adjusting cap 46. When using such an arrangement the valve 18 may be immediately adjusted to the desired setting without requiring observation of the oil droplets.

Figure 6:
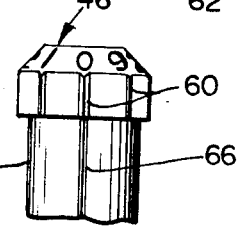
FIG. 6 is a front elevation of the cap illustrating the manner in which the reference scale registers with the reference index.

Due to the irregular shape of the knob 36 and recess 54, the cap 46 and knob 36 are registrable only when in a single, relative position. The knob 36, therefore, must be secured to the stem 34 in the proper relative position so that, when the cap 46 is placed on the knob 36, character 64 of the reference scale which corresponds to the valve setting is in registry with the reference index 66 to indicate the true valve setting. One of the features of our invention resides in the construction of the valve adjusting members by which it is insured that the cap and hence its reference scale will be properly positioned. This is achieved by initially securing the valve seat 14, valve body 12, and needle valve 18 in the frame 16 with the valve in its fully closed position as shown in FIG. 1. Only after the valve is fully closed is the knob 36 secured, such as by a press fit, to the outwardly protruding valve stem 34. When assembled in this manner a reference mark or unique portion of the knob 36, such as the apex 44, is maintained in registry with the reference index 66 on the frame 16 to position properly the knob 36 so that when the cap 46 thereafter is engaged with the knob 36, that character 64 of the reference index which is intended to correspond to a fully closed valve setting will be in registry with the apex 44 of the knob 36 and the reference index 66. As shown in FIGS. 4 and 6 the character 0 would indicate a fully closed valve setting. Thus by initially securing the knob 36 to the valve stem 34 with the apex 44 and reference index 66 in registry the reference scale will be calibrated properly with respect to the reference index and will thereafter indicate the true valve setting. Thus by constructing the knob 36 to define the apex 44 a dual function is served both to insure proper calibration of the reference scale with the reference index 66 and to discourage gripping of the knob by conventional tools.

In some instances it may be desirable to provide a means for yieldably retaining the adjusting cap 46 in its knob engaging position about the end of the valve body 12. This may be desirable when the valve is disposed in an inverted attitude or when the valve is used in connection with vibrating machinery or other environments in which there would be a tendency for the cap to become dislodged. In order to maintain the cap 46 in position under such conditions the valve body 12 is provided with a lip 68 surrounding the sidewall 30 which cooperates with an inwardly extending flange 70 formed about the inner periphery of the adjusting cap. The adjusting cap, as will be described below, is preferably formed from a yieldable, resilient plastic material and the dimensions of the flange 68 and lip 70 are such as to provide an interference fit so that the lip 70 may yieldably expand to permit the flange 68 to be snapped into the groove 72 of the adjusting cap as shown in FIG. 1. The resilient character of the cap 46 permits its removal so that the valve may be left in its tamper proof condition when this is desired.

As mentioned above, the collar 19 is of greater dimensions than the flange 27 at the top of the valve bore 25. This arrangement provides a safety feature which is particularly advantageous when the valve is used in conjunction with relatively high pressure systems, such as in the disclosed air line lubricator. The restriction presented by the flange 27 precludes the valve member 18 from moving axially and outwardly beyond the position where the collar 19 of the valve member 18 engages the flange 27. This insures that when the valve is adjusted to its fully open position, the internal pressure acting on the valve member 18 will not cause the valve member to be ejected forcibly from the valve body 12. The danger of a sudden and unexpected blowout of the valve member 18 is thus avoided.

When assembling the valve and its aforementioned control members the valve member 18 is inserted, stem portion 34 first, upwardly into the bore into threaded engagement with the valve body 12 until the stem 34 protrudes into the recess 32 of the valve body. The valve body 12 is then secured to the lubricator frame 16 and the valve stem 34 is rotated to a closed position as described above. The knob 38 is then secured to the valve stem 34 in the aforementioned manner.

We claim:
1. A tamper proof valve adjusting assembly comprising:
 a valve body;
 a valve member rotatably mounted to said valve body, said valve member having a knob extending outwardly of said valve body, said knob being of irregular peripheral shape;
 an outwardly extending sidewall formed integrally with said valve body, said sidewall extending beyond and about said knob to thereby define a recess in which said knob is contained;
 said sidewall and the periphery of said knob being dimensioned to provide a relatively small clearance therebetween, said clearance being of sufficient dimensions to permit free unhindered rotation of said knob within said recess; and an adjusting cap adapted to fit removably over the end of said sidewall, said cap having an inwardly extending rib contoured and dimensioned to fit snugly within said small clearance and to occupy substantially all of said clearance, said rib being of complementary contour to the irregular periphery of said knob to enable said knob to be gripped by said inwardly extending rib whereby said knob and valve member will rotate with said adjusting cap.

2. A device as claimed in claim 1 further comprising:

a fixed reference index on said body adjacent said adjusting cap so that the periphery of said cap may rotate past said reference mark when said cap is rotated; and a reference scale circumferentially spaced about the periphery of said cap to enable the relative rotary position of said cap and hence said valve member to be determined readily.

3. A device as claimed in claim 1 wherein said adjusting cap has an inwardly extending circumferential skirt adapted to circumscribe and extend inwardly about the periphery of said sidewall;

said sidewall having an enlarged peripheral flange formed about its outer periphery; and a resilient rib formed about the internal periphery of said skirt portion of said cap, said internal rib being of smaller dimensions than those of said external flange formed on said valve body whereby said cap may be snapped onto said valve body, said resilient character of said internal rib of said cap permitting subsequent removal of said cap.

4. A device as claimed in claim 1 wherein said valve member comprises a needle valve movable axially in response to said rotation thereof, said cap further comprising; means constructing said recess to permit axial movement of said stem portion of said valve and said knob throughout the entire range of axial movement thereof, the interior knob engaging a portion of said inwardly extending rib being so contoured to maintain its snug fit about the periphery of said stem portion during said axial movement of said stem and knob within said recess.

5. A device as claimed in claim 1 wherein the peripheral contour of said knob is defined by a circular surface having a pair of chordal flats formed thereon to define a pair of chordal lines about the periphery of said knob, said chordal lines being disposed at substantially right angles to each other, said circular surface being disposed in close proximity to said sidewall, and wherein said adjusting cap is formed to be accomodated between said circular surface and sidewall, and is removably and directly insertable between them.

6. A device as claimed in claim 1 wherein the peripheral contour of said knob is defined by a pair of divergent surfaces diverging at substantially right angles; and a convex arcuate surface extending between the divergent ends of said diverging surfaces and intersecting each of said diverging surfaces, said arcuate surface being disposed in close proximity to said sidewall, and wherein said adjusting cap is formed to to be accommodated between said circular surface and sidewall, and is removably and directly insertable between them.

7. A device as claimed in claim 6 wherein said arcuate segment defines a circle and wherein said diverging straight surfaces define chords of said circle.

8. An adjustable valve assembly comprising:

a valve body;

a valve member rotatably mounted to said valve body, said valve member having a stem portion extending outwardly of said valve body;

a reference index formed on said valve body;

a knob secured to said outwardly extending valve stem for rotation therewith, said knob having a reference mark formed thereon, said knob being secured to said valve stem in a position such that when valve member is rotated to its fully closed position said reference mark of said knob is in registry with said reference index on said valve body, said knob being of irregular shape and disposed within a recess formed in said valve body, said device further comprising:

a cap having a portion adapted for insertion into said recess and being of substantially complementary shape to that of said knob so that said cap may register with and grip said knob when said cap and said knob are in a predetermined relative position; and said cap having a reference scale circumferentially spaced thereabout in such a manner that when said valve member has been rotated to its fully closed position said reference index on said valve body will be in registry both with said reference mark on said knob and a selected one of the characters of said circumferentially disposed reference scale on said cap.

9. A device as claimed in claim 8 wherein the shape of said knob is defined by a pair of surfaces diverging from an apex at substantially right angles; and a convex arcuate surface extending between the divergent ends of said diverging surfaces and intersecting each of said diverging surfaces, said apex comprising said reference mark of said valve stem.

10. A device as claimed in claim 9 wherein said recess is defined by an outwardly extending sidewall circumscribing said knob, the clearance between the periphery of said knob and said sidewall being relatively small to preclude said knob from being gripped readily by conventional tools.